(12) United States Patent
Redemann et al.

(10) Patent No.: US 11,708,875 B2
(45) Date of Patent: Jul. 25, 2023

(54) DIRECTIONAL ARROW ON A BRAKE CARRIER

(71) Applicant: WABCO Europe BVBA, Brussels (BE)

(72) Inventors: Bernward Redemann, Hockenheim (DE); Vitalij Scherer, Leimen (DE)

(73) Assignee: ZF CV Systems Europe BV, Brussels (BE)

( * ) Notice: Subject to any disclaimer, the term of this patent is extended or adjusted under 35 U.S.C. 154(b) by 311 days.

(21) Appl. No.: 17/057,825

(22) PCT Filed: May 23, 2018

(86) PCT No.: PCT/EP2018/063512
§ 371 (c)(1),
(2) Date: Nov. 23, 2020

(87) PCT Pub. No.: WO2019/223862
PCT Pub. Date: Nov. 28, 2019

(65) Prior Publication Data
US 2021/0199165 A1 Jul. 1, 2021

(51) Int. Cl.
| | | |
|---|---|---|
| *F16D 65/097* | (2006.01) | |
| *F16D 55/226* | (2006.01) | |
| *F16D 65/00* | (2006.01) | |
| *F16D 65/092* | (2006.01) | |
| *F16D 65/18* | (2006.01) | |
| *F16D 55/00* | (2006.01) | |
| *F16D 66/00* | (2006.01) | |

(52) U.S. Cl.
CPC ....... *F16D 55/226* (2013.01); *F16D 65/0056* (2013.01); *F16D 65/092* (2013.01); *F16D 65/183* (2013.01); *F16D 2055/0008* (2013.01); *F16D 2066/003* (2013.01)

(58) Field of Classification Search
CPC .. F16D 55/226; F16D 65/0056; F16D 65/092; F16D 65/183; F16D 2055/0008; F16D 2066/003
USPC ........................ 188/73.37, 73.39, 73.43, 370
See application file for complete search history.

(56) References Cited

U.S. PATENT DOCUMENTS 4,705,093 A * 11/1987 Ogino .................... F16D 55/226
188/73.31
5,234,080 A * 8/1993 Pantale ................. F16D 55/226
188/73.31
(Continued)

FOREIGN PATENT DOCUMENTS

DE 102008003526 A1 7/2009
EP 3101302 A2 * 12/2016 ......... F16D 55/2265
(Continued)

*Primary Examiner* — Christopher P Schwartz
(74) *Attorney, Agent, or Firm* — Dickinson Wright PLLC (57) ABSTRACT

The invention relates to a vehicle brake, in particular a utility vehicle disc brake, having a brake carrier with at least one brake pad holder, at least one brake pad which is guided so as to be axially displaceable and supported in the brake pad holder, and a brake caliper which is axially movable relative to the brake carrier. According to the invention, it is proposed that the brake carrier is structurally reinforced on the run-out side relative to the run-in side, and at least one running direction indicator for indicating the first rotational direction is arranged on the brake carrier.

15 Claims, 8 Drawing Sheets

(56) References Cited

U.S. PATENT DOCUMENTS

| | | | | |
|---|---|---|---|---|
| 6,135,246 | A | * | 10/2000 | Gautier ................. F16D 55/227 |
| | | | | 188/73.39 |
| 10,138,962 | B2 | * | 11/2018 | Rguichi .............. F16D 55/2265 |
| 10,837,506 | B2 | * | 11/2020 | Beyer ................. F16D 65/0973 |
| 2016/0160945 | A1 | * | 6/2016 | Gasslbauer ......... F16D 65/0976 |
| | | | | 188/73.38 |

FOREIGN PATENT DOCUMENTS

| | | |
|---|---|---|
| WO | 2015022081 A1 | 2/2015 |
| WO | 2015049283 A1 | 4/2015 |
| WO | 2017178096 A1 | 10/2017 |

\* cited by examiner

DIRECTIONAL ARROW ON A BRAKE CARRIER

FIELD

The present disclosure relates to a vehicle brake, in particular a utility vehicle disc brake, having a brake carrier with at least one brake pad holder, at least one brake pad which is guided so as to be axially displaceable and supported in the brake pad holder, and a brake caliper which is axially movable relative to the brake carrier, wherein the brake carrier has a run-in side at which a brake disc runs into the brake carrier on rotation in a first rotational direction, and a run-out side at which the brake disc runs out of the brake carrier on rotation in the first rotational direction.

BACKGROUND

In vehicle brakes, it is generally a challenge that when braking a vehicle from forward travel in which typically higher speeds are achieved, a vehicle brake is mechanically more heavily loaded than in braking processes from typically slower reverse travel. On the basis of this knowledge, the prior art discloses vehicle brakes in which the brake carrier is configured asymmetrically with respect to the run-in side and run-out side of the brake disc.

The run-in side is the side of the brake caliper or brake carrier on which a brake disc effectively enters the brake caliper or brake carrier—i.e. in other words, the side on which a portion of a brake disc surface is first at least partially covered by the brake caliper or brake carrier on rotation in the first rotational direction. Such a theoretical portion of a brake disc surface leaves the cover region of the brake caliper or brake carrier again at the run-out side.

Typically, the portions of the brake disc carrier which correspond to the run-out side of the brake disc in the forward travel direction of the vehicle are reinforced. On a braking process from high speed in forward travel, these regions absorb the highest forces and loads and are accordingly designed more robustly than the regions of the brake at which the brake pad runs out of the brake only on reverse travel.

With such asymmetrical brake carriers, it must always be ensured that they are mounted on the vehicle in the correct orientation. In the worst case, mounting opposite the required mounting direction could lead to individual parts of the brake failing during braking processes in which high forces are involved because of the asymmetric design of the brake carrier. In addition, such an asymmetric design of the brake carrier typically entails a high production complexity and high production costs, since a number of components must be designed direction-specifically.

SUMMARY

It is therefore an object of the present disclosure to improve a vehicle brake of the type described above such that the disadvantages found in the prior art are eliminated as far as possible. In particular, a vehicle brake is provided which is optimized with respect to braking loads typically occurring in vehicle usage, which can be produced more economically and in a less complex fashion, and for which mounting on a vehicle in the correct orientation is ensured.

According to the present disclosure, this object is achieved with a vehicle brake in which the brake carrier is structurally reinforced on the run-out side relative to the run-in side, and at least one running direction indicator for indicating the first rotational direction is arranged on the brake carrier.

The present disclosure makes use of the knowledge that an asymmetric design of the brake carrier, in which the run-out side has a greater material strength than the run-in side, is particularly suitable for compensating for the brake loads occurring in the forward travel of the vehicle, and is also not over-dimensioned for reverse travel of the vehicle. With such a component design however, it must be ensured that the vehicle brake is mounted on the vehicle with the direction-specific brake carrier in the correct orientation. The arrangement of a running direction indicator to indicate the first rotational direction—which according to the invention corresponds to the main operating direction of the vehicle (i.e. in particular the forward direction)—ensures that the brake carrier is correctly mounted. Only the direction-specific component "brake carrier" is provided with a running direction indicator. Advantageously, this achieves a high level of mounting security, production costs are reduced, and a high variability may be ensured with respect to the use of all other direction-specific components of the vehicle brake.

In one aspect, on the run-in side and/or on the run-out side, the brake carrier has a carrier cheek which at least partially surrounds a brake disc and includes an end face facing away from the receiving space, wherein the at least one running direction indicator is arranged on the end face.

Thus, the brake carrier as a whole has a frame-like design, wherein the frame portions assigned to the run-in side and the run-out side are known as carrier cheeks. These carrier cheeks thus preferably at least partially surround the outer delimiting face of the brake disc receiving space. At least one of the carrier cheeks preferably has end faces which are visible in a mounted state of the vehicle brake, both when the vehicle brake is mounted as a separate component and also when the vehicle brake is mounted on the vehicle. Thus, if the running direction indicator is arranged on the end faces, in each mounting state it is reliably evident to the installer how the brake should be mounted, and after being mounted it is easy to see whether mounting has taken place correctly.

The brake carrier preferably has an application side and a reaction side. The carrier cheek preferably extends from the application side to the reaction side.

According to an aspect, the structural reinforcement takes the form of one, several, or all of the following:
  on the run-out side, the brake carrier has a higher material strength than on the run-in side;
  the width and/or the height of a carrier cheek on the run-out side is greater than the width and/or the height of a carrier cheek on the run-in side; or
  the height of a carrier cheek on an application side is greater than the height of a carrier cheek on a reaction side.

The highest brake forces typically occur when the vehicle is moving forward with high speed and is rapidly braked. The greatest forces and moments to be tolerated on sides of the brake carrier thus occur on the side that corresponds to the run-out side of the brake disc relative to the forward travel of the vehicle. Also, greater forces and moments to be tolerated occur on the application side of the brake than on the reaction side of the brake. Corresponding component dimensioning takes account of the different force ratios on the application side and reaction side, and thus serves to save material and weight in comparison with fully symmetrical brake parts.

According to an aspect, the running direction indicator is configured as a direction indicator arrow which points with an arrow tip in the direction of the first rotational direction. The advantage of such a directional arrow is that this typically does not leave any room for interpretation with respect to the preferred running direction. In other words, such an arrow can be uniquely correlated to the preferred running direction for assembly and operating personnel irrespective of different cultural environments.

The brake carrier is preferably formed as an integral component, in particular an integral casting, with at least one molded direction indicator arrow. It is preferred that the corresponding positive or negative form belonging to the directional arrow is already formed in the casting mold, and the arrow is thus applied to the brake carrier directly as a result of the casting process.

The vehicle brake, according to one aspect, is furthermore configured such that the direction indicator arrow is raised relative to a surface of the brake carrier, in particular relative to the end face. A raised position of the indicator arrow relative to the surface of the brake carrier as a whole promotes identifiability and detectability thereof. Vehicle brakes are frequently mounted under only limited optimum light conditions, so that tactile perceptibility of such an arrow is of great importance in particular in such environments.

According to an another, the direction indicator arrow is formed as a recess relative to a surface of the brake carrier, in particular relative to the end face. This recess may in principle be a depression relative to the surface of the brake carrier, or a complete material cutout which may be made in the brake carrier already on casting or in the context of a machining step following the casting.

According to another aspect it is furthermore preferred that the length of the direction indicator arrow is at least 25 mm and the width of the direction indicator arrow is at least 15 mm. Such a minimum dimensioning of the direction indicator arrow ensures that this remains reliably perceptible and identifiable even under poor visibility conditions. It is furthermore preferred that the direction indicator arrow has a height or depth of at least 0.5 mm relative to a surface of the brake carrier, wherein such dimensioning ensures that the directional arrow can be reliably detected and identified.

In addition, the direction indicator arrow may have an external layer of signal paint to improve visual perceptibility. The external signal paint layer is preferably produced in a signal color such as red. In one aspect, the direction indicator arrow has a fluorescent coating. Visibility of the direction indicator arrow can thus be achieved in a workshop environment using a light source configured for this purpose, if for various reasons it is undesirable for the arrow to be permanently visible to everyone.

According to an aspect, the direction indicator arrow also has a knurling on its surface. A good tactile perceptibility of the direction indicator arrow is thus promoted.

According to an aspect of the disclosure, the brake carrier includes at least one carrier tip for guiding and supporting the at least one brake pad on the run-in side and run-out side, wherein the carrier tip on the run-out side has a greater height than on the run-in side. As already stated, the greatest brake forces typically occur when the vehicle is travelling with a high forward speed and is braked hard. The greatest forces and moments to be tolerated on sides of the brake carrier occur on the side which corresponds to the run-out side of the brake disc relative to the forward travel of the vehicle. For this reason, it is preferred that the carrier tip on the run-out side has a greater height than on the run-in side.

On the other hand, an advantage of an asymmetric design of the brake carrier is that on the run-in side, a carrier tip with a lower height is sufficient to hold the brake pads. This optimized design of the brake carrier as a whole allows a saving in installation space and component mass.

The height of the brake tips on the run-in side and run-out side preferably extends in the radial direction relative to the brake disc.

The present disclosure has been described above with reference to a vehicle brake. In a further aspect, the present disclosure concerns a vehicle, in particular a utility vehicle, with a vehicle brake. The present disclosure achieves the objects described above with respect to the vehicle in that the vehicle brake is configured according to any of the embodiments described above.

With respect to the advantages of such a vehicle, reference is made to the above statements and these are hereby included.

BRIEF DESCRIPTION OF THE DRAWINGS

The invention will be explained in more detail below with respect to preferred exemplary embodiments with reference to the attached figures, in which.

DETAILED DESCRIPTION OF THE DRAWINGS

Figure 1:
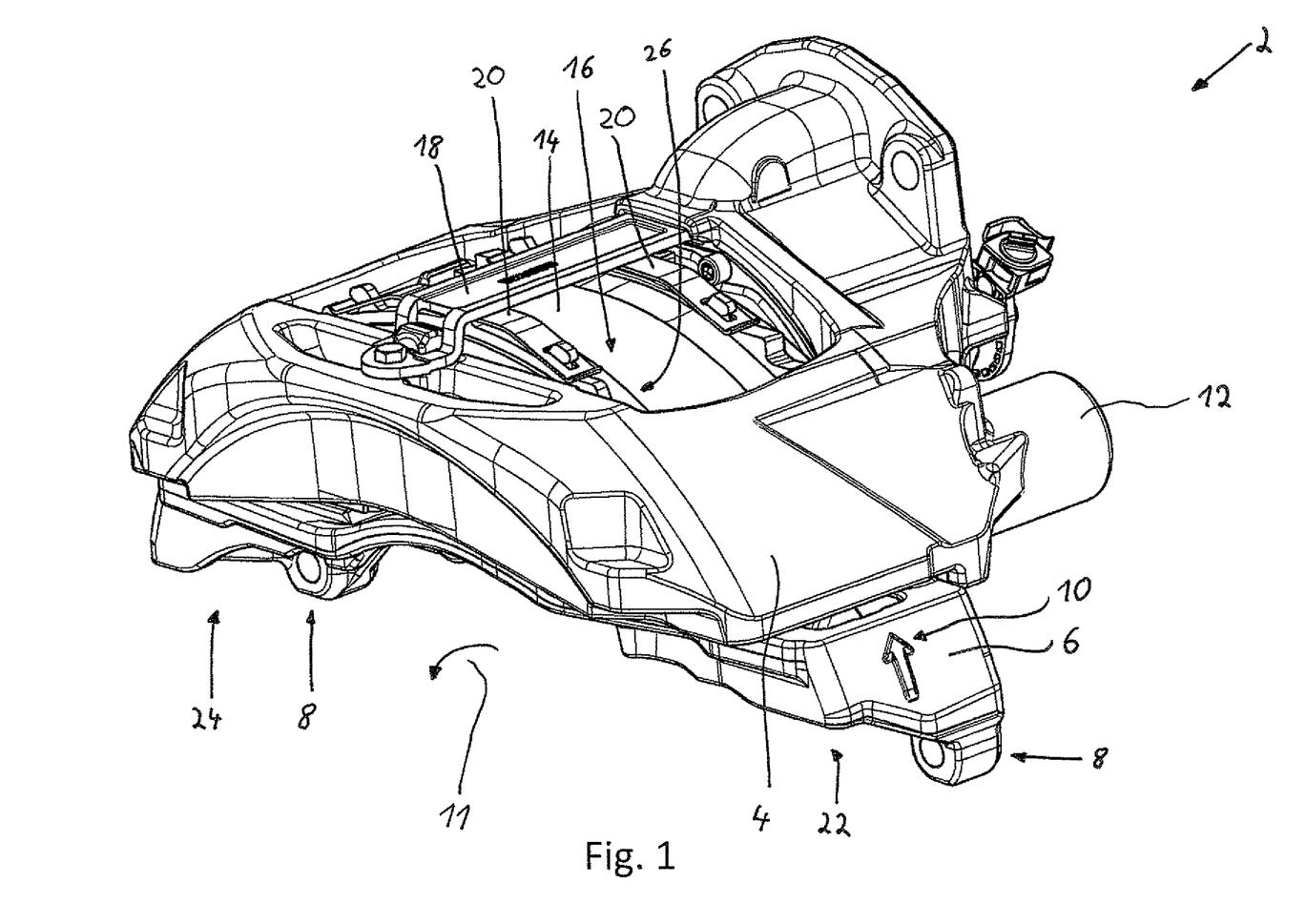
FIG. 1 is a perspective view of a first exemplary embodiment of a vehicle brake according to the present disclosure.

FIG. 1 illustrates a vehicle brake 2 which has a brake carrier 6 and brake caliper 4. The brake carrier 6 is connected in a suitable fashion to a vehicle via fixing portions 8. The present vehicle brake 2 is configured as a floating caliper disc brake in which the brake caliper 4 is axially movable relative to the brake carrier 6. The brake caliper 4 in the present case slides on guide bolts 12 which are in turn connected to the brake carrier 6.

Furthermore, the vehicle brake 2 has a brake pad 14 on an application side of the vehicle brake 2, and a brake pad 26 on a reaction side of the brake 2. Between the brake pads 14 and 26 is a receiving space 16 for a brake disc. If the vehicle brake 2 is mounted on a vehicle, a brake disc is arranged in the receiving space 16. The brake pads 14 and 26 are supported and guided so as to be axially movable in the brake caliper 4. The brake pads 14 and 26 are pressed in the direction of the brake carrier 6 by way of a retaining bracket 18 which acts on retaining springs 20. When the brake pads 14, 26 are changed, these may be removed from the vehicle brake 2 after removal of the retaining bracket 18 and retaining springs 20, without the need for more extensive dismantling of the vehicle brake 2.

When the vehicle brake 2 is actuated, an application force is applied to the brake pad 14 in the direction of a brake disc arranged in the brake disc receiving space 16. Because of the sliding mounting of the brake caliper 4, the second brake pad 26 is also pressed in the direction of a brake disc on the reaction side of the brake. In this case, the brake caliper 4 slides on the guide bolts 12 in the direction of a brake disc arranged in the brake disc receiving space 16. If no further application force is applied to the brake pad 14, the brake caliper 4 and the brake pad 26 slide back in the direction of a starting or venting position. The brake disc is now no longer in contact with the brake pads 14 and 26 and no further braking effect is achieved.

The vehicle brake 2 is designed for a first rotational direction 11 of the brake disc. In vehicles, this typically corresponds to the vehicle forward travel direction. With respect to the first rotational direction 11, the brake carrier 6 has a run-in side 22 at which a brake disc effectively runs into the brake carrier 6, i.e. in other words, the side at which a portion of a brake disc surface is first at least partially covered by the brake carrier 6 on rotation in a first rotational direction 11, and a run-out side 24 at which such a theoretical portion of a brake disc surface leaves the cover region of the brake carrier 6 again.

In vehicle brakes 2, on hard braking from forward travel, the greatest forces and loads occur on the run-out side 24. For this reason, the brake carrier 6—as will be explained in more detail in the following figures—is designed to be stronger on the run-out side 24 of the brake carrier 6 than on the run-in side 22. This means that mounting the vehicle brake 2 opposite a first preferred rotational direction of the brake disc may, in the worst case, lead to the vehicle brake 2 failing under hard braking with high brake forces and loads. To ensure correct mounting with respect to the first rotational direction 11, therefore a running direction indicator 10—in the present case configured as a directional arrow 10—is arranged on the brake carrier 6. The direction indicator arrow 10 is arranged on the brake carrier 6 so that it can be reliably identified both when the vehicle brake 2 is fully installed (as in FIG. 1) and when the vehicle brake 2 is installed on a vehicle.

Figure 2:
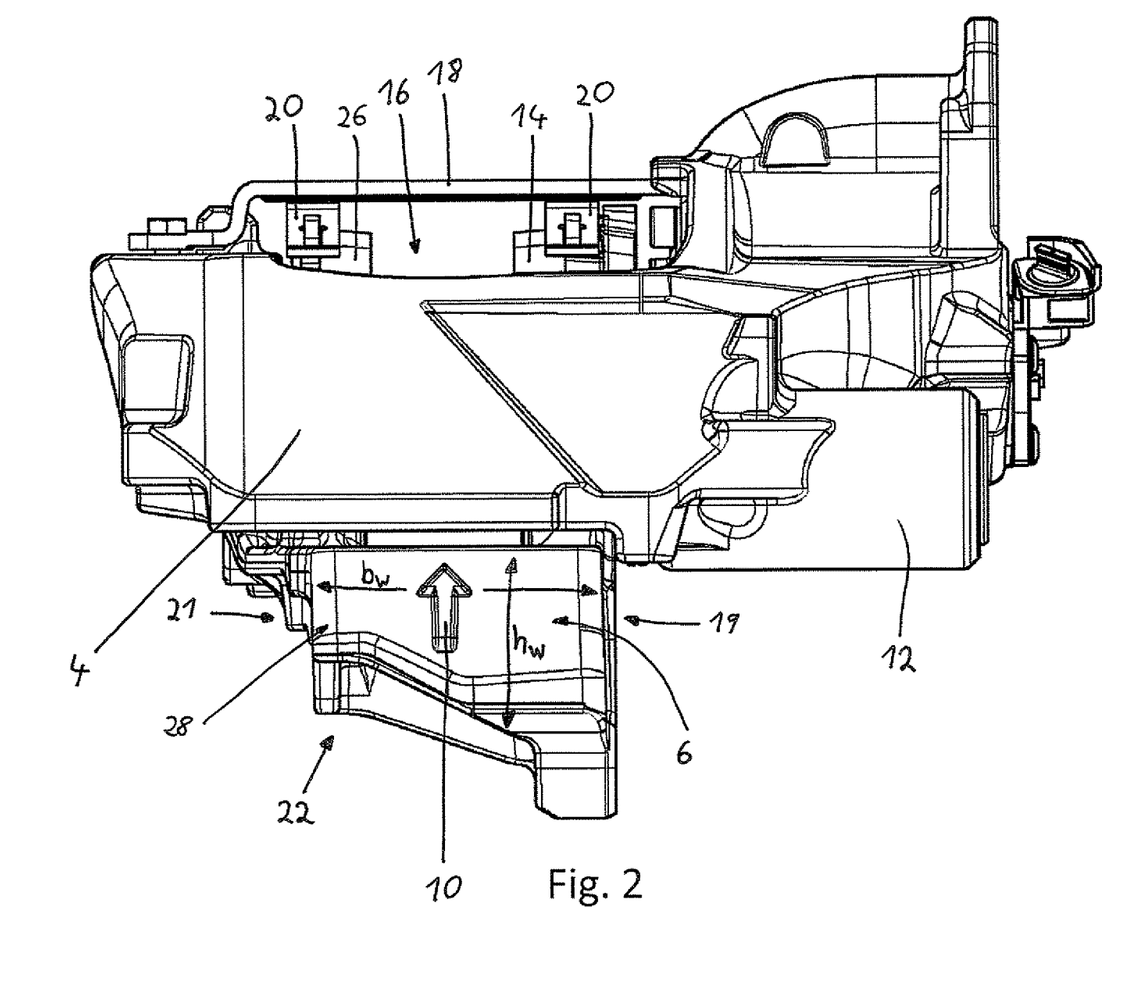
FIG. 2 is a side view of the exemplary embodiment of the vehicle brake of FIG. 1 according to the present disclosure.

FIG. 2 shows the exemplary embodiment of the vehicle brake 2 from FIG. 1 in a side view. It is evident from FIG. 2 that the direction indicator arrow 10 can also be identified clearly and easily from this different perspective, so that incorrect mounting of the vehicle brake 2 according to the present disclosure may be prevented. It is furthermore evident from the figure that the width bw and the height hw of a carrier cheek 28 on the run-in side 22 are smaller than the width bw' and height hw' of a carrier cheek 28' on the run-out side 24 (see FIG. 8). Also, the height hw of the carrier cheek 28 on an application side 19 is greater than the height hw of the carrier cheek 28 on a reaction side 21.

Figure 3:
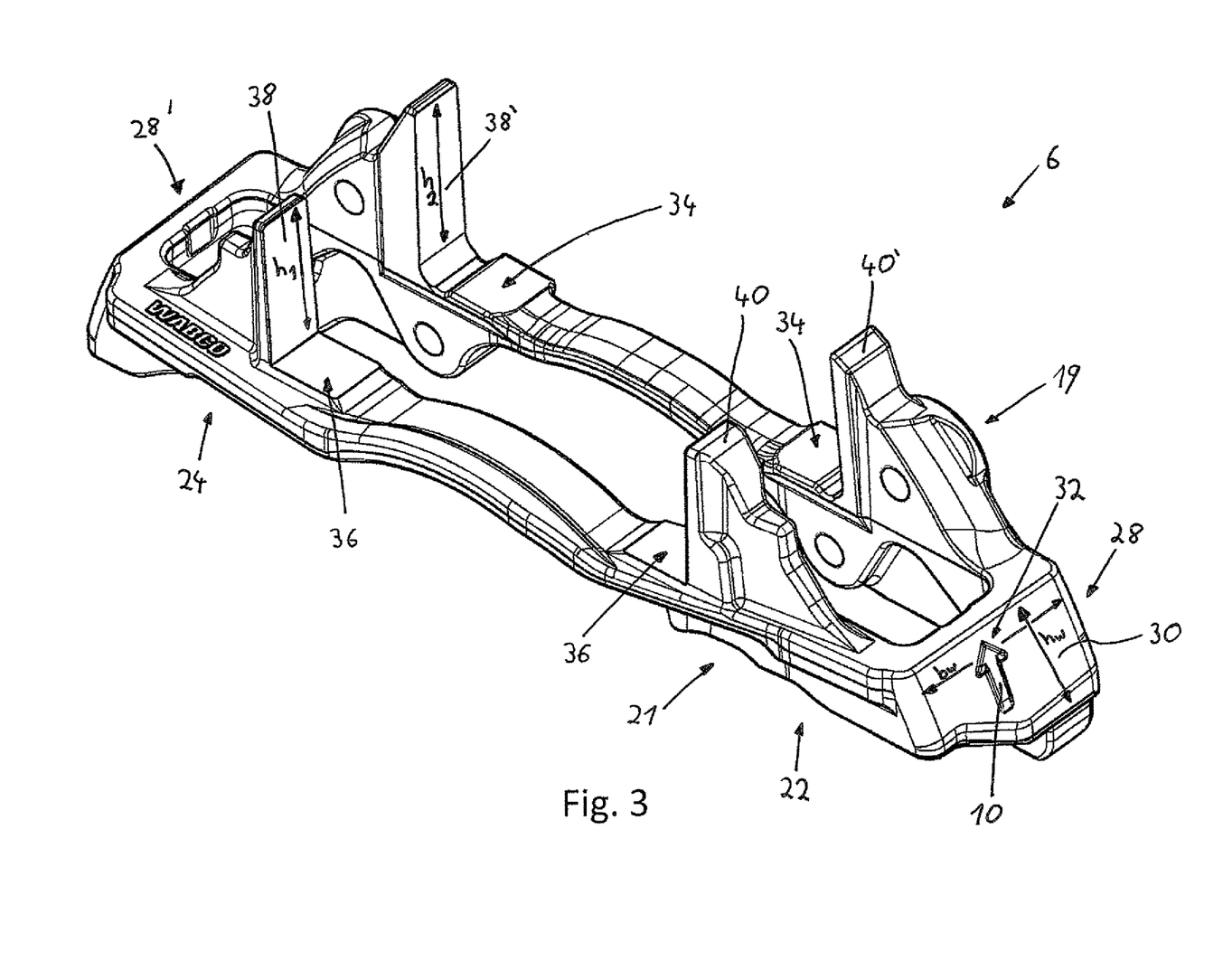
FIG. 3 is a perspective view of a brake carrier of the vehicle brake of FIGS. 1 and 2 according to the present disclosure.

FIG. 3 shows the brake carrier 6 in a perspective view. The brake carrier 6 has brake pad holders 34 and 36 for holding the brake pads 14 and 26. The brake pad holders 34 and 36 guide the brake pads 14 and 26 in axially displaceable fashion and support brake pads 14 and 26 in the tangential direction with respect to the rotational direction of a brake disc. In the tangential direction, the brake pads 14 and 26 are held by carrier tips 38, 38', 40, 40'. The carrier tips 38, 38' are arranged on the run-out side 24, and the carrier tips 40 and 40' are arranged on the run-in side 22.

According to an aspect of the present disclosure, the brake carrier 6 has a frame-like structure.

Carrier cheeks 28, 28' are arranged on the ends of the brake carrier 6 so as to connect the brake pad holders 34 and 36 and also surround the brake disc receiving space 16. These carrier cheeks 28, 28' in turn have end faces 30, wherein the direction indicator arrow 10, 10' is preferably arranged on these end faces 30, 30'. As already stated, the end faces 30, 30' with direction indicator arrow 10, 10' are clearly visible from various directions when the brake carrier 6 is mounted on the vehicle brake 2 and on a vehicle. The carrier tips 38, 38' and 40, 40' have heights h1 to h4. Thus carrier tip 38 has the height h1, carrier tip 38' has height h2, carrier tip 40 has height h4 (see FIG. 5) and carrier tip 40' has height h3 (see FIG. 5).

As evident from FIG. 3, the design of the carrier tips 38', 40' on the application side 19 differs from the design of the carrier tips 38 and 40 on the reaction side 21. The carrier tips 38', 40' on the application side 19 have greater heights h2 and h3 (see FIG. 5) than the corresponding carrier tips 38, 40 on the reaction side 21 (h1 and h4). The height h2 of the carrier tip 38' on the run-out side 24 is greater than that of the carrier tip 40' on the run-in side 22. Thus the brake carrier 6 is designed asymmetrically with respect to the running direction of a brake disc. On the run-out side 24, at which greater braking forces and loads occur during forward travel of the vehicle, the brake carrier 6 has greater strength.

Figure 4:
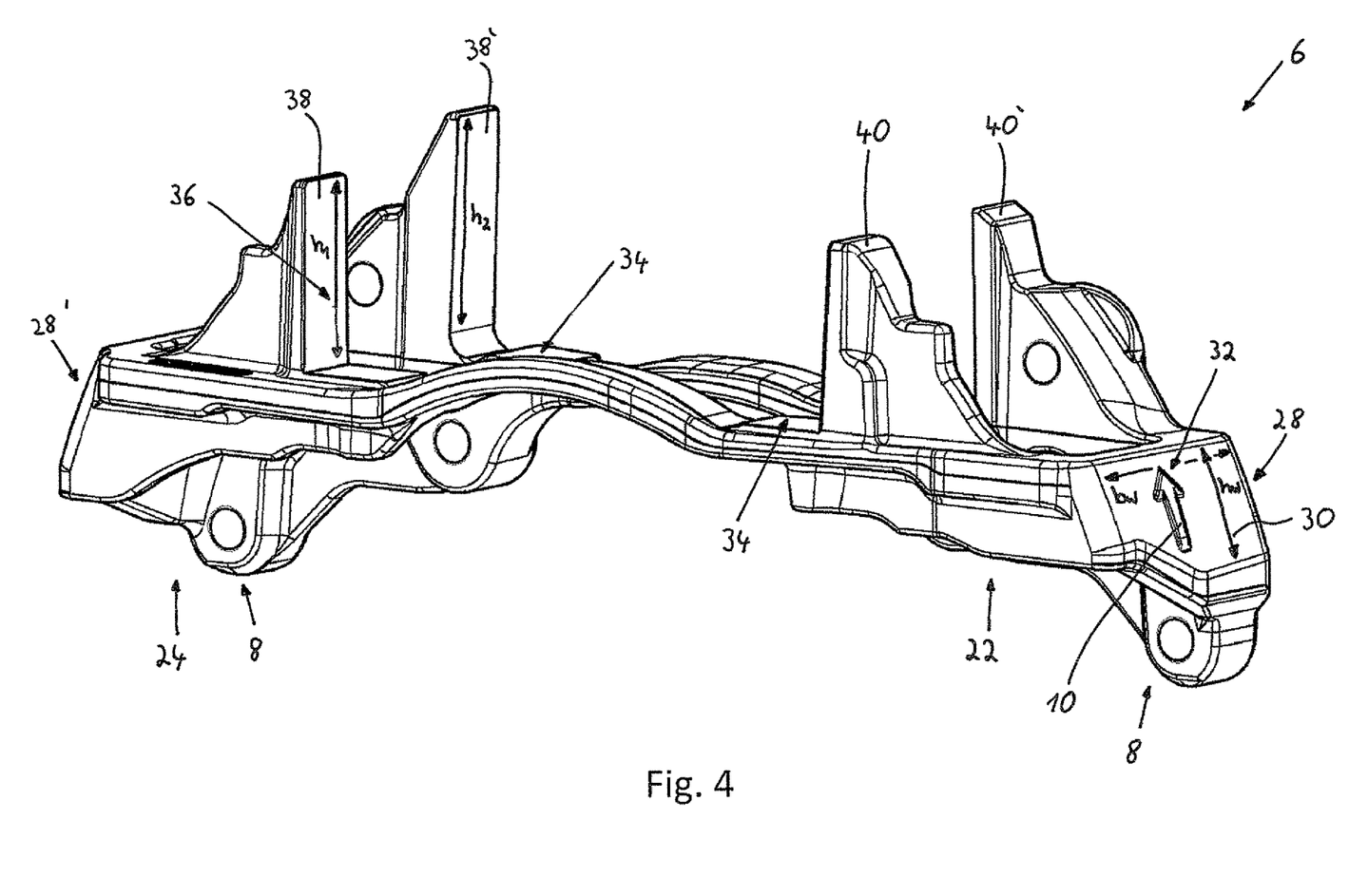
FIG. 4 is a perspective view of the brake carrier of FIG. 3 according to the present disclosure.

FIG. 4 shows the exemplary embodiment of the brake carrier 6 of FIG. 3 from another perspective. Here, the fixing portions 8 with which the brake carrier 6 can be fixed to a vehicle, in particular to a vehicle flange, are clearly shown. From this perspective, it is also clear that the carrier tips 38, 38' on the run-out side 24 differ in design from the carrier tips 40, 40' on the run-in side 22.

Figure 5:
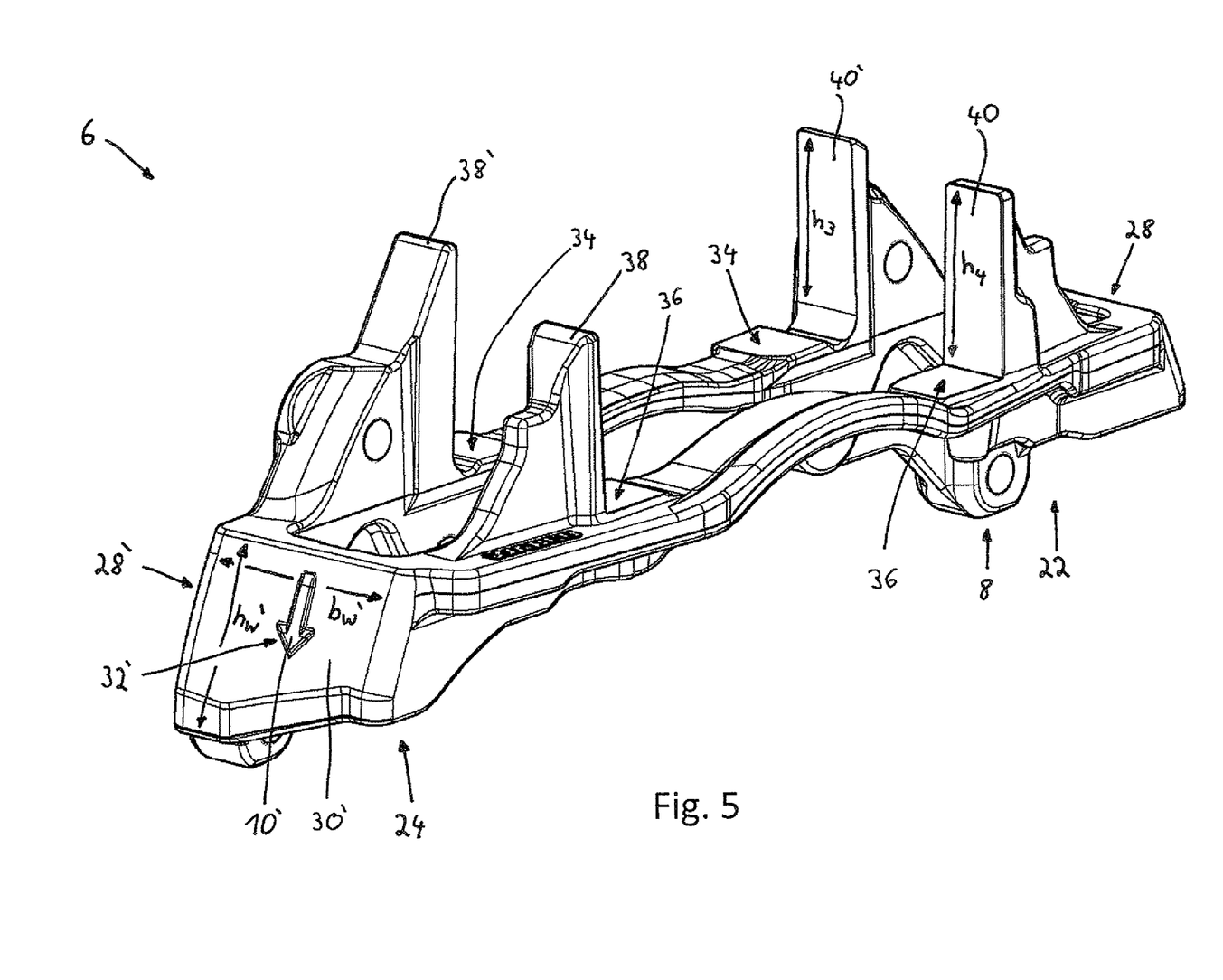
FIG. 5 is a perspective view of the brake carrier of FIGS. 3 and 4 according to the present disclosure.

FIG. 5 shows another perspective of the brake carrier 6 from FIGS. 3 and 4. As evident from this perspective, on the carrier cheek 28' on the run-out side 24 and opposite the direction indicator arrow 10, the brake carrier 6 has a further direction indicator arrow 10'. This is arranged on a second end face 30'. The arrow tip 32' again points in the direction of the first rotational direction 11 of a brake disc, and thus unmistakably indicates the mounting direction to be taken into account.

Figure 6:
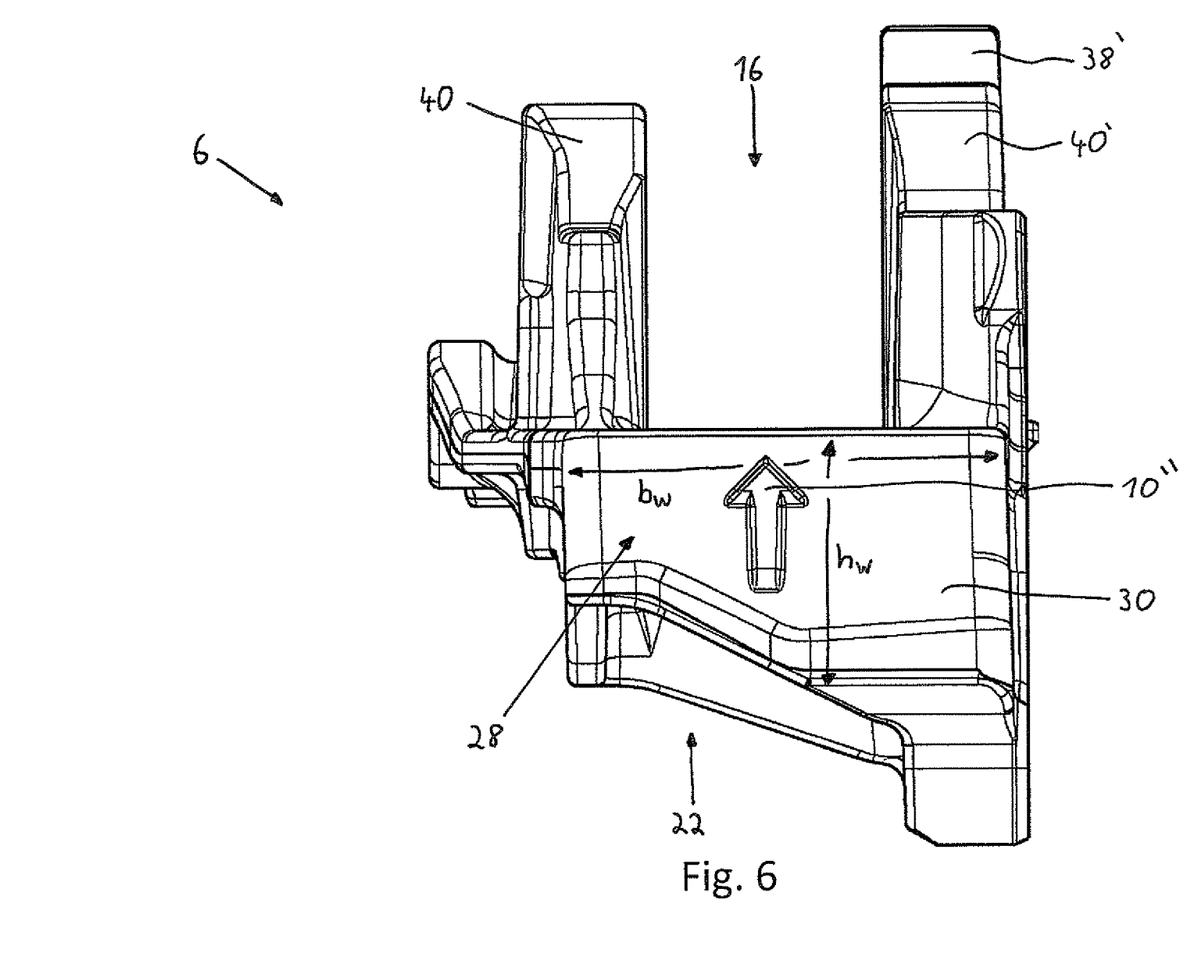
FIG. 6 is a side view of the brake carrier of FIGS. 3-5 according to the present disclosure.

FIG. 6 shows a side or end view of the brake carrier 6 of FIGS. 3 to 5, where FIG. 6 clearly shows the different design of the carrier tips 38, 38' on the run-out side 24 in comparison with the design of the carrier tips 40, 40' on the run-in side 22. The direction indicator arrow 10" shown in the figure is recessed relative to the end face 30.

Figure 7:
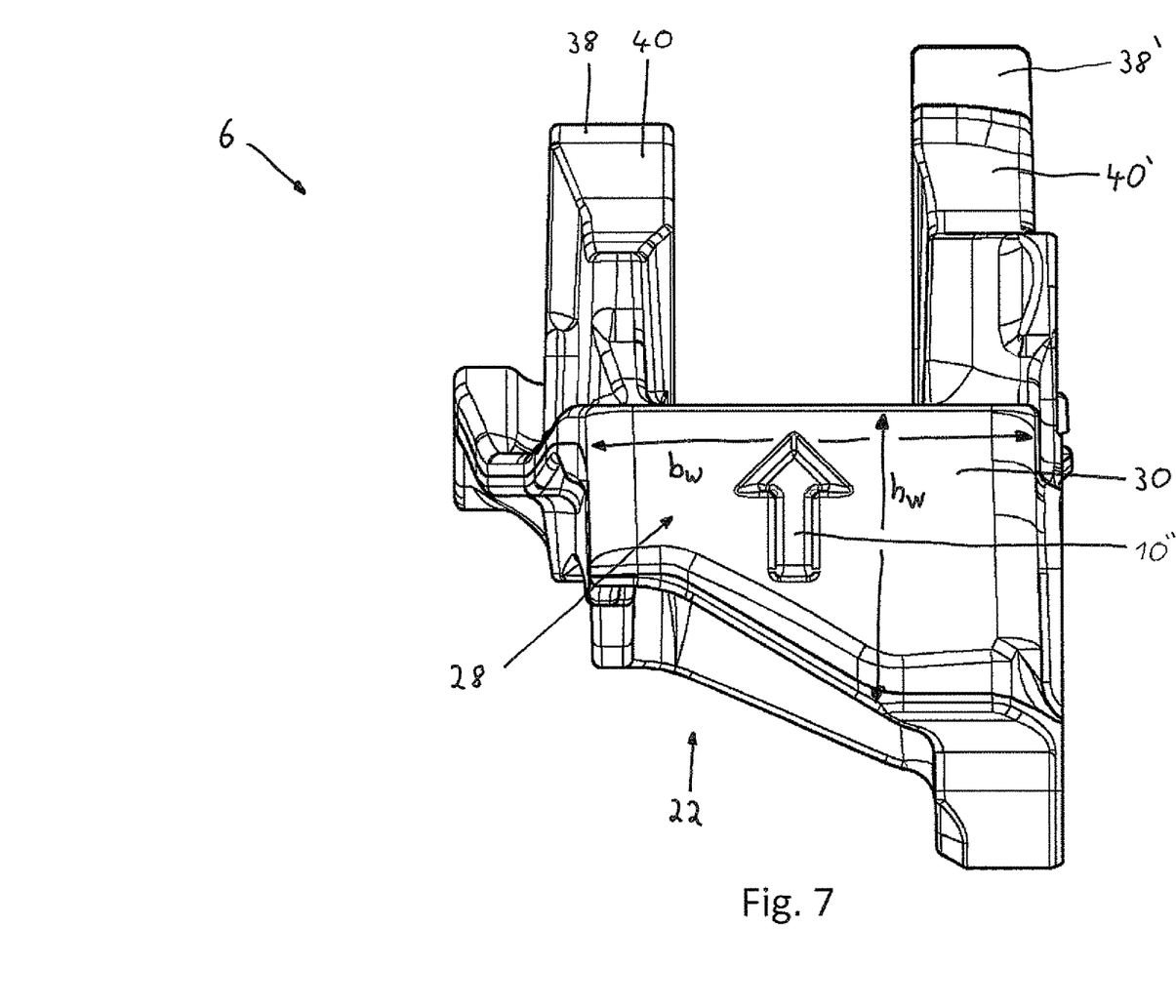
FIG. 7 is a side view of an alternative exemplary embodiment of a brake carrier according to the present disclosure.

FIG. 7 shows an alternative exemplary embodiment of a brake carrier 6 in which, in particular, the geometry of the direction indicator arrow 10''' has been changed relative to the exemplary embodiment in FIGS. 3 to 6. As evident from the figure, the direction indicator arrow 10''' is in particular formed wider than in the above-mentioned embodiments. This may support the reliable detectability of such a direction indicator arrow 10'''.

Figure 8:
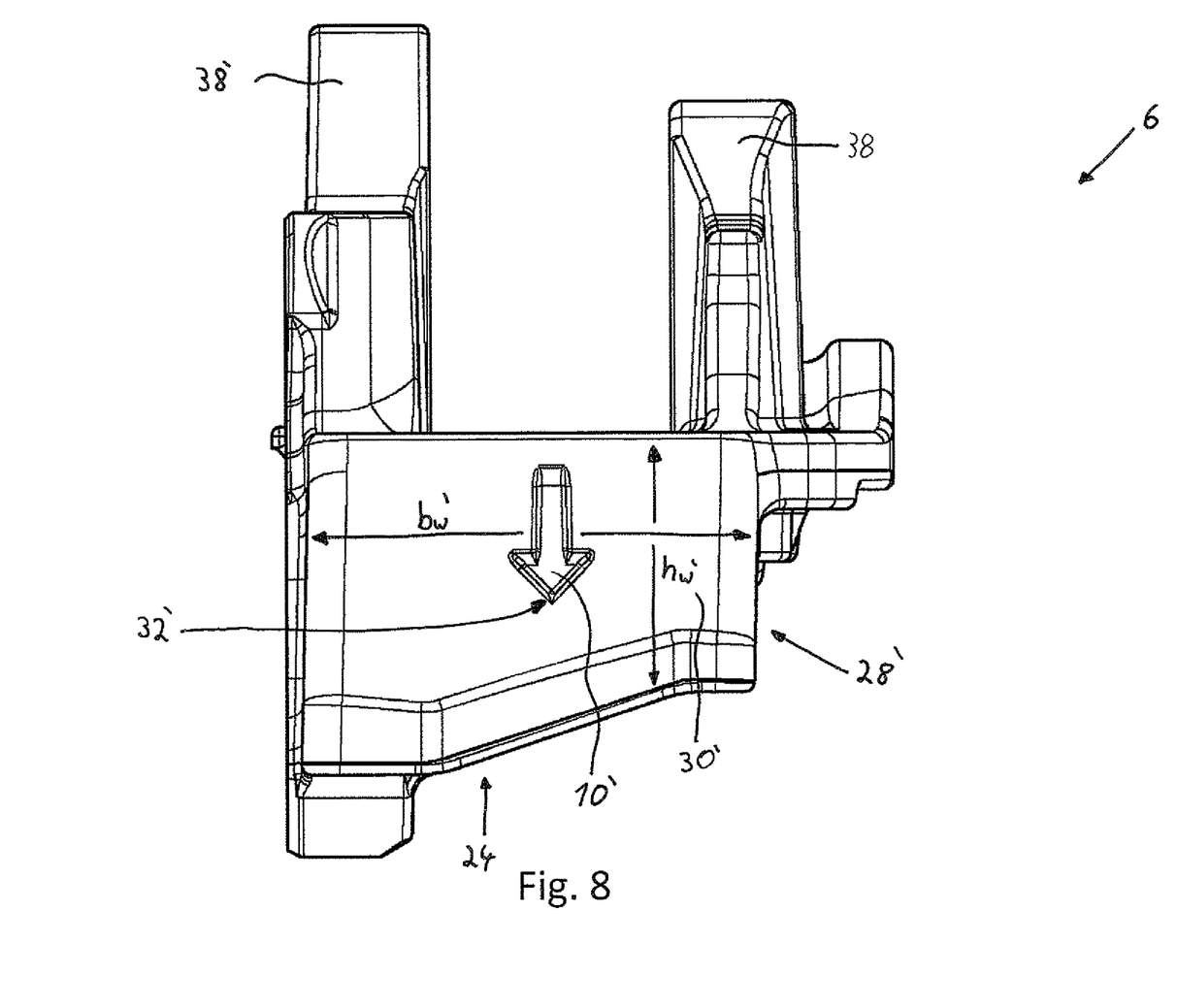
FIG. 8 is a side view of the brake carrier of FIGS. 3-6 according to the present disclosure.

FIG. 8 illustrates brake carrier 6 of FIGS. 3 to 6, where FIG. 8 shows a side or end view of the run-out side 24 of the brake carrier 6. The running direction indicator 10' again points in the first rotational direction 11 of a brake disc, wherein the direction indicator arrow 10' is arranged on the end face 30'. From the perspective selected, the higher and wider carrier tips 38, 38' on the run-out side 24 of the brake carrier 6 and the vehicle brake 2 can be seen.

While the above description constitutes the preferred embodiments of the present invention, it will be appreciated that the invention is susceptible to modification, variation and change without departing from the proper scope and fair meaning of the accompanying claims.

The invention claimed is:

1. A vehicle brake (2) comprising:
   a brake carrier (6) with at least one brake pad holder (34, 36),
   at least one brake pad (14, 26) that is axially displaceable and supported in the brake pad holder (34, 36), and
   a brake caliper (4) that is axially movable relative to the brake carrier (6),
   wherein the brake carrier (6) has a run-in side (22) at which a given portion of a brake disc enters into the brake carrier (6) on rotation in a first rotational direction (11), and a run-out side (24) at which the given portion of the brake disc exits the brake carrier (6) on rotation in the first rotational direction (11),
   wherein the brake carrier (6) is structurally reinforced on the run-out side (24) relative to the run-in side (22), and
   at least one running direction indicator (10, 10') for indicating the first rotational direction (11) is arranged on the brake carrier (6);
   wherein the running direction indicator (10, 10') is configured as a direction indicator arrow (10, 10') which points with an arrow tip (32, 32') in the direction of the first rotational direction (11).

2. The vehicle brake (2) as claimed in claim 1, wherein the length of the direction indicator arrow (10, 10') is at least 25 mm and the width of the direction indicator arrow is at least 15 mm.

3. The vehicle brake (2) as claimed in claim 2, wherein the direction indicator arrow (10, 10') has a height or depth of at least 0.5 mm relative to a surface of the brake carrier (6).

4. The vehicle brake (2) as claimed in claim 1, wherein on the run-in side (22) and on the run-out side (24), the brake carrier (6) has respective carrier cheeks (28, 28') which at least partially surround a brake disc receiving space (16) and includes an end face (30, 30') facing away from the receiving space (16), wherein the at least one running direction indicator (10, 10') is arranged on at least one of the end faces (30, 30') of the carrier cheeks.

5. The vehicle brake (2) as claimed in claim 1, wherein the structural reinforcement includes at least one of:
   on the run-out side (24), the brake carrier (6) has a higher strength than on the run-in side (22);
   a width bw and/or a height hw of a carrier cheek (28) on the run-out side (24) is greater than a width bw' and/or a height hw' of a carrier cheek (28) on the run-in side (22);
   the height hw of the carrier cheek (28) is greater on an application side (19) of the brake carrier than on a reaction side (21) of the brake carrier.

6. The vehicle brake (2) as claimed in claim 1, wherein the direction indicator arrow (10, 10') is formed as a recess relative to an end face (30, 30') of the brake carrier (6).

7. The vehicle brake (2) as claimed in claim 1, wherein the direction indicator arrow (10, 10') has an external layer of signal paint to improve perceptibility.

8. The vehicle brake (2) as claimed in claim 1, wherein the direction indicator arrow (10, 10') has a knurling on its surface.

9. The vehicle brake (2) as claimed in claim 1, wherein the brake carrier (6) includes at least one carrier tip (38, 38', 40, 40') for guiding and supporting the at least one brake pad (14, 26) on both the run-in side (22) and run-out side (24), wherein the at least one carrier tip (38, 38') on the run-out side (24) has a greater height h than on the run-in side (22).

10. A vehicle with the vehicle brake (2) as claimed in claim 1.

11. A vehicle brake (2) comprising:
    a brake carrier (6) with at least one brake pad holder (34, 36),
    at least one brake pad (14, 26) that is axially displaceable and supported in the brake pad holder (34, 36), and
    a brake caliper (4) that is axially movable relative to the brake carrier (6),
    wherein the brake carrier (6) has a run-in side (22) at which a given portion of a brake disc enters into the brake carrier (6) on rotation in a first rotational direction (11), and a run-out side (24) at which the given portion of the brake disc exits the brake carrier (6) on rotation in the first rotational direction (11),
    wherein the brake carrier (6) is structurally reinforced on the run-out side (24) relative to the run-in side (22), and
    at least one running direction indicator (10, 10') for indicating the first rotational direction (11) is arranged on the brake carrier (6);
    wherein the brake carrier (6) is formed as an integral cast component with at least one molded direction indicator arrow (10, 10').

12. The vehicle brake (2) as claimed in claim 1, wherein the direction indicator arrow (10, 10') is raised relative to an end face (30, 30') of the brake carrier (6).

13. A vehicle brake (2) comprising:
    a brake carrier (6) with at least one brake pad holder (34, 36),
    at least one brake pad (14, 26) that is axially displaceable and supported in the brake pad holder (34, 36), and
    a brake caliper (4) that is axially movable relative to the brake carrier (6),
    wherein the brake carrier (6) has a run-in side (22) at which a given portion of a brake disc enters into the brake carrier (6) on rotation in a first rotational direction (11), and a run-out side (24) at which the given portion of the brake disc exits the brake carrier (6) on rotation in the first rotational direction (11),
    wherein the brake carrier (6) is structurally reinforced on the run-out side (24) relative to the run-in side (22), and
    at least one running direction indicator (10, 10') for indicating the first rotational direction (11) is arranged on the brake carrier (6);
    wherein the running direction indicator is in the form of a pointer.

14. The vehicle brake of claim 13, wherein the pointer is integrally molded with the brake carrier.

15. The vehicle brake of claim 13, wherein the pointer defines a shape that tapers down in the running direction.

* * * * *